(12) United States Patent
Cheng et al.

(10) Patent No.: US 12,463,546 B2
(45) Date of Patent: Nov. 4, 2025

(54) HIGH RESPONSE TIME SYNCHRONOUS RECTIFICATION CIRCUIT AND CONTROL METHOD THEREOF

(71) Applicant: INFSITRONIX TECHNOLOGY CORPORATION, Jhubei (TW)

(72) Inventors: Yuan-Kai Cheng, Jhubei (TW); Chung-Chih Hung, Jhubei (TW); Jen-Hao Lo, Jhubei (TW)

(73) Assignee: Infsitronix Technology Corporation, Jhubei (TW)

( * ) Notice: Subject to any disclaimer, the term of this patent is extended or adjusted under 35 U.S.C. 154(b) by 379 days.

(21) Appl. No.: 18/052,365

(22) Filed: Nov. 3, 2022

(65) Prior Publication Data

US 2023/0275522 A1   Aug. 31, 2023

Related U.S. Application Data

(60) Provisional application No. 63/275,073, filed on Nov. 3, 2021.

(51) Int. Cl.
  *H02M 3/335* (2006.01)
  *H02M 1/00* (2006.01)
(52) U.S. Cl.
  CPC ..... *H02M 3/33592* (2013.01); *H02M 1/0009* (2021.05); *H02M 1/0032* (2021.05)
(58) Field of Classification Search
  CPC .................................................. H02M 3/33592
  See application file for complete search history.

(56) References Cited

U.S. PATENT DOCUMENTS

| 6,987,389 | B1 * | 1/2006 | Macbeth ............. H02H 1/0015 |
| | | | 324/536 |
| 10,840,817 | B1 * | 11/2020 | Chopra ............. H02M 3/33592 |

FOREIGN PATENT DOCUMENTS

| TW | 202038550 A | 10/2020 |
| TW | 202118202 A | 5/2021 |
| TW | 202135453 A | 9/2021 |

OTHER PUBLICATIONS

First Office Action mailed to Taiwanese Counterpart Application No. 111142087 on May 3, 2023.
Search Report mailed to Taiwanese Counterpart Application No. 111142087 on May 3, 2023.

* cited by examiner

*Primary Examiner* — Peter M Novak
(74) *Attorney, Agent, or Firm* — Rosenberg, Klein & Lee (57) ABSTRACT

The present application provides a synchronous rectification circuit and a control method thereof. A switching element of the synchronous rectification circuit is controlled to turn on or turn off by detecting the occurrence of a positive or negative transition of the inductive voltage of the secondary winding. The synchronous rectification circuit comprises a transition detector for coupling to the secondary winding, a transition controller for coupling to the transition detector, and a switching element comprising a control terminal for coupling to the transition controller.

13 Claims, 6 Drawing Sheets

HIGH RESPONSE TIME SYNCHRONOUS RECTIFICATION CIRCUIT AND CONTROL METHOD THEREOF

CROSS-REFERENCE TO RELATED APPLICATIONS

This application claims the benefits of priority from the provisional Patent Application No. 63/275,073, title of "POWER SUPPLY," filed on Nov. 3, 2021, which are incorporated herein by reference in their entirety.

FIELD OF THE INVENTION

The present application generally relates to a rectification circuit and the control method thereof, and particularly to a synchronous rectification circuit and the control method thereof applicable to a power supply.

BACKGROUND OF THE INVENTION

For modern switching power supplies, a rectification device will be generally connected in series at the output for controlling the DC output voltage. The rectification device can be a rectifying diode. Nonetheless, with the technical development of electronic devices, the forward voltage drop of rectifying diodes limits the power supplies increasingly.

To meet the requirements of low output voltage and high output power, synchronous rectification circuits are developed to replace rectifying diodes. Nonetheless, in current technologies of synchronous rectification circuits, two or more voltage comparators are required to compare two reference signals, respectively, for outputting the corresponding control signals to control the turning-on and turning-off of rectifying transistors.

The two reference signals usually include an upper-limit reference signal and a lower-limit reference signal so that a voltage comparator can compare a detection voltage with the lower-limit reference signal and outputs a signal to control the transistor to turn on when the detection voltage is smaller than the lower-limit reference signal and another signal to control the transistor to turn off when the detection voltage is greater than the upper-limit reference signal. Unfortunately, there exists an operational delay in the voltage comparator. Thereby, when the voltage comparator controls the transistor to cut off, the delay occurs. At this moment, if the switch for the primary winding of the switching power supply has been turned on and the transistor in the synchronous rectification circuit has not turned off yet, the overlapping between the operations of the primary and secondary windings occurs and thus reducing energy conversion efficiency.

To overcome the above problem, there are two solutions according to the prior art. The first is to adopt a voltage comparator with higher operational speed for lowering the operational delay as much as possible. Nonetheless, the difficulty and area of the circuit design will be increased. The other solution is to lead the switch or winding signal of the primary winding to the synchronous rectification circuit of the secondary winding directly for controlling the synchronous rectification circuit using the signal of the primary winding. Unfortunately, the method requires high-voltage coupling devices and increases system costs significantly. Thereby, in practice, this solution is rarely accepted in the product market. Accordingly, it is required to improve the secondary side synchronous rectifier control in the prior art.

SUMMARY

An objective of the present application is to solve the above problems by providing a synchronous rectification circuit and the control method thereof. By detecting positive or negative state transitions occurring in the induction voltage of the secondary winding, the switch of the synchronous rectification circuit can be controlled to turn on or off. Thereby, the simultaneous conduction of the switch of the primary winding and the switch of the synchronous rectification circuit can be avoided. Then the energy conversion efficiency can be improved and the power consumption of a switching power supply can be reduced.

To achieve the above objective, the present application provides a synchronous rectification circuit, which comprises a state transition detector, a state transition controller, and a switch. The state transition detector is coupled to the secondary winding. The state transition controller is coupled to the state transition detector. The switch includes a control terminal, which is coupled to the state transition controller. The state transition detector measures the transient variation signal of an induction voltage of the secondary winding. The state transition controller receives the signal output by the state transition detector for detecting if a positive state transition or a negative state transition occurs in the induction voltage. When the state transition controller detects the positive state transition occurring in the induction voltage, the switch is controlled to turn off. When the state transition controller detects the negative state transition occurring in the induction voltage, the switch is controlled to turn on.

To achieve the above objective, the present application provides a control method for the synchronous rectification circuit, which comprises detecting the transient variation signal of an induction voltage of the secondary winding using a state transition detector; and receiving the signal output by the state transition detector using a state transition controller for detecting if a positive state transition or a negative state transition occurs in the induction voltage. When the state transition controller detects the positive state transition occurring in the induction voltage, the switch is controlled to turn off. When the state transition controller detects the negative state transition occurring in the induction voltage, the switch is controlled to turn on.

DETAILED DESCRIPTION

In order to make the structure and characteristics as well as the effectiveness of the present application to be further understood and recognized, the detailed description of the present application is provided as follows along with embodiments and accompanying figures. The concepts of the present application can be embodied in various forms. Those embodiments are not used to limit the scope and range of the present application.

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other devices or connecting means indirectly.

Figure 1:
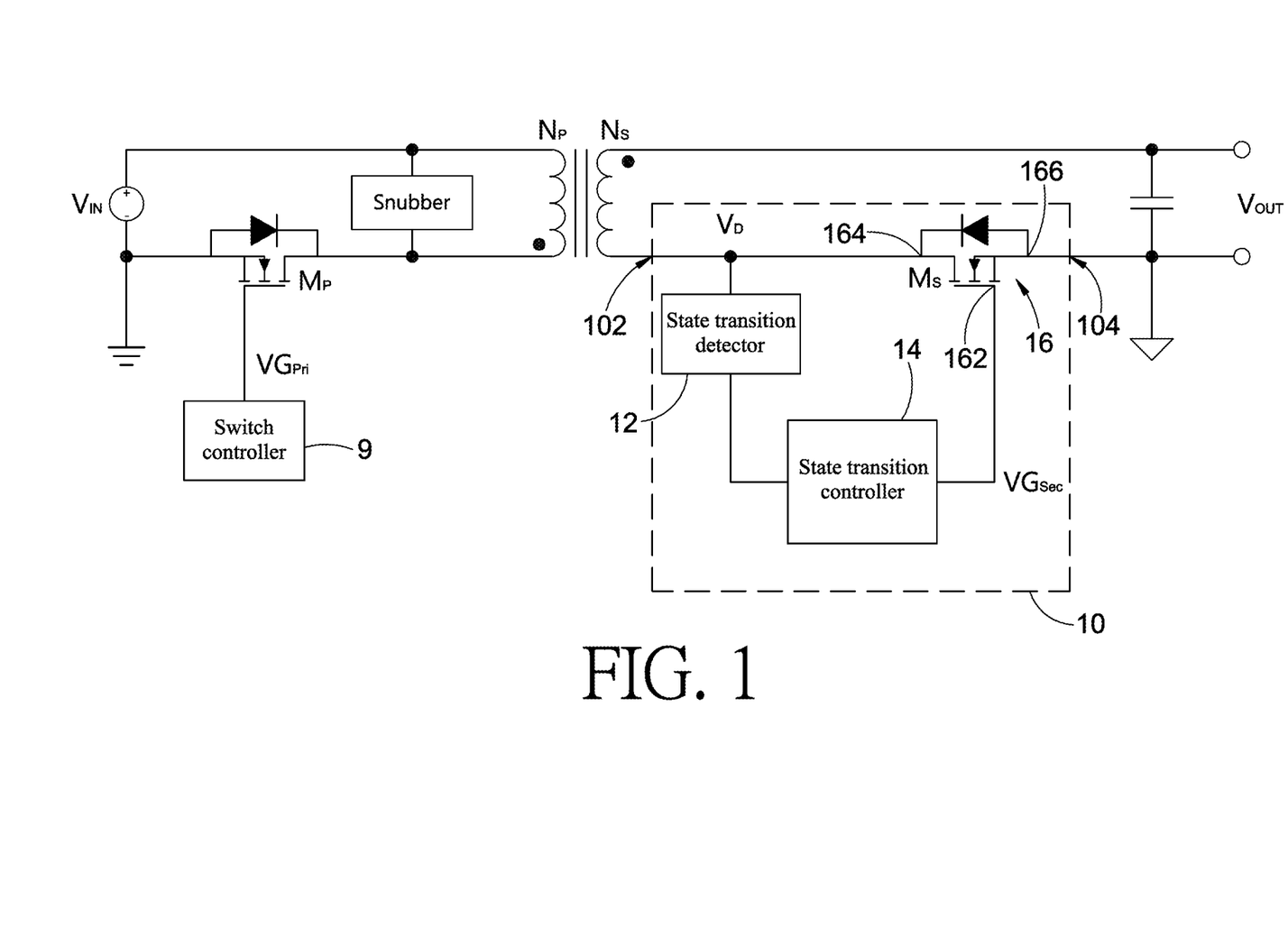
FIG. 1 shows a schematic diagram of the circuit architecture according to the first embodiment of the present application.

First, please refer to FIG. 1, which shows a schematic diagram of the circuit architecture according to the first embodiment of the present application. As shown in the figure, a synchronous rectification circuit 10 according to the present embodiment comprises a state transition detector 12, a state transition controller 14, and a switch 16. The state transition detector 12 is coupled to a secondary winding Ns of a switching power supply. The state transition controller 14 is coupled to the state transition detector 12. The switch 16 is coupled to the state transition controller 14. The switching power supply further includes a primary winding Np corresponding to the secondary winding Ns. The primary winding Np is coupled to a primary-winding switch Mp, which can receive a switch signal $VG_{Pri}$ of the primary winding output by a switch controller 9 for being turned on or off.

To elaborate, the state transition detector 12 can include a high-pass filter for receiving the transient variation signal of the secondary winding Ns. The state transition controller 14 can include a decoder. The input terminal of the state transition controller 14 is coupled to the state transition detector 12 for receiving the signal detected by the state transition detector 12, decoding and judging the signal, and generating a control signal $VG_{Sec}$ correspondingly.

A control terminal 162 of the switch 16 is coupled to the output terminal of the state transition controller 14 for receiving the control signal $VG_{Sec}$ from the state transition controller 14 and controlling the switch 16 to turn on or off. The switch 16 can include a transistor Ms, such as metal-oxide-semiconductor field-effect transistor (MOSFET). The control terminal 162 is equivalent to a gate of the transistor Ms of the switch 16 and is coupled to the output terminal of the state transition controller 14. A switch output terminal 164 of the switch 16 is coupled to a rectification output terminal 102 of the synchronous rectification circuit 10. Equivalently, a drain of the transistor Ms is coupled to the rectification output terminal 102 of the synchronous rectification circuit 10. A switch input terminal 166 of the switch 16 is coupled to a rectification input terminal 104 of the synchronous rectification circuit 10. Equivalently, a source of the transistor Ms is coupled to the rectification input terminal 104 of the synchronous rectification circuit 10. According to another embodiment of the present application, the switch 16 can be a junction gate field-effect transistor (JFET) or a bipolar junction transistor (BJT).

The rectification output terminal 102 is coupled to one terminal of the secondary winding Ns for rectifying the output voltage Your of the secondary winding Ns using the switch 16. The state transition detector 12 can measure the transient variation signal of an induction voltage $V_D$ of the secondary winding Ns. For convenience, according to the present embodiment, the state transition detector 12 is coupled to the terminal of the secondary winding Ns that is coupled to the rectification output terminal 102. Thereby, the induction voltage $V_D$ is equivalent to the voltage of the switch output terminal 164 of the switch 16. Alternatively, according to another embodiment of the present application, the state transition detector 12 can be coupled to another terminal of the secondary winding Ns. Because the voltage variation of the secondary winding Ns formed by inducing the primary winding Np will appear on both terminals of the secondary winding Ns simultaneously, the details will not be repeated.

Figure 2:
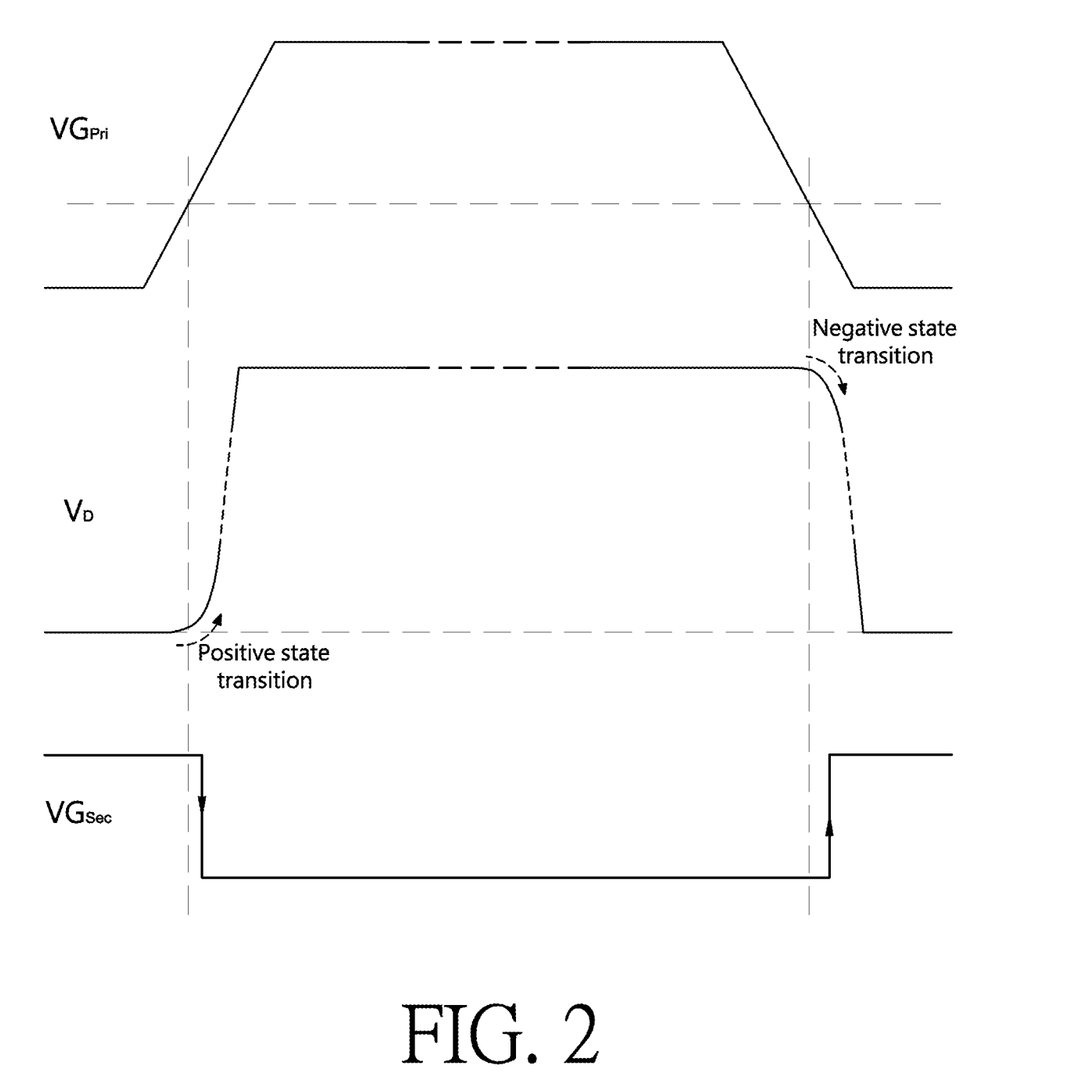
FIG. 2 shows schematic diagrams of the switch signal of the primary winding and the induction voltage of the secondary winding for a switching power supply according to an embodiment of the present application.

Please refer to FIG. 2, which shows schematic diagrams of the switch signal $VG_{Pri}$ of the primary winding Np and the induction voltage $V_D$ of the secondary winding Ns for a switching power supply according to an embodiment of the present application. While the switch signal $VG_{Pri}$ of the primary winding Np is rising, the induction voltage $V_D$ of the secondary winding Ns will have a positive state transition, namely, a transient change from a low voltage level to a high voltage level. To trigger the positive state transition, it is not required that the switch signal $VG_{Pri}$ of the primary winding Np rises to the target value completely. In general, it happens when the switch signal $VG_{Pri}$ of the primary winding Np approaches the threshold voltage Vt of the primary-winding switch Mp. Once the switch signal $VG_{Pri}$ of the primary winding Np rises close to the target value, the primary-winding switch Mp will be turned on, enabling the input voltage VIN to store energy to the second winding Ns via the primary winding Np. In the process, the induction voltage $V_D$ will be increased continuously. On the other hand, in the process when the switch signal $VG_{Pri}$ of the primary winding Np is falling, the induction voltage $V_D$ of the secondary winding Ns will have a negative state transition, namely, a transient variation is rendered from a high voltage level to a low voltage level. To trigger the negative state transition, it is not required that the switch signal $VG_{Pri}$ of the primary winding Np falls to the target value completely. In general, it happens when the switch signal $VG_{Pri}$ of the primary winding Np approaches the threshold voltage Vt of the primary-winding switch Mp. Once the switch signal $VG_{Pri}$ of the primary winding Np falls close to the target value, the primary-winding switch Mp will be turned off, enabling the second winding Ns to release the stored energy. In the process, the induction voltage $V_D$ will be decreased continuously.

Accordingly, the synchronous rectification circuit 10 according to the embodiment of the present application detects the positive or negative state transitions described above by using the state transition detector 12 and the state transition controller 14. The state transition controller 14 generates the control signal $VG_{Sec}$ according to the occurrence of the positive or negative state transitions for controlling the switch 16 to turn on or off. To be more specific, since the positive state transition will occur before the primary-winding switch Mp is turned on, by changing the control signal $VG_{Sec}$ to turn off the switch 16 when the positive state transition is happening, simultaneous conduction of the primary-winding switch Mp and the switch 16 can be avoided effectively, and vice versa.

Figure 3:
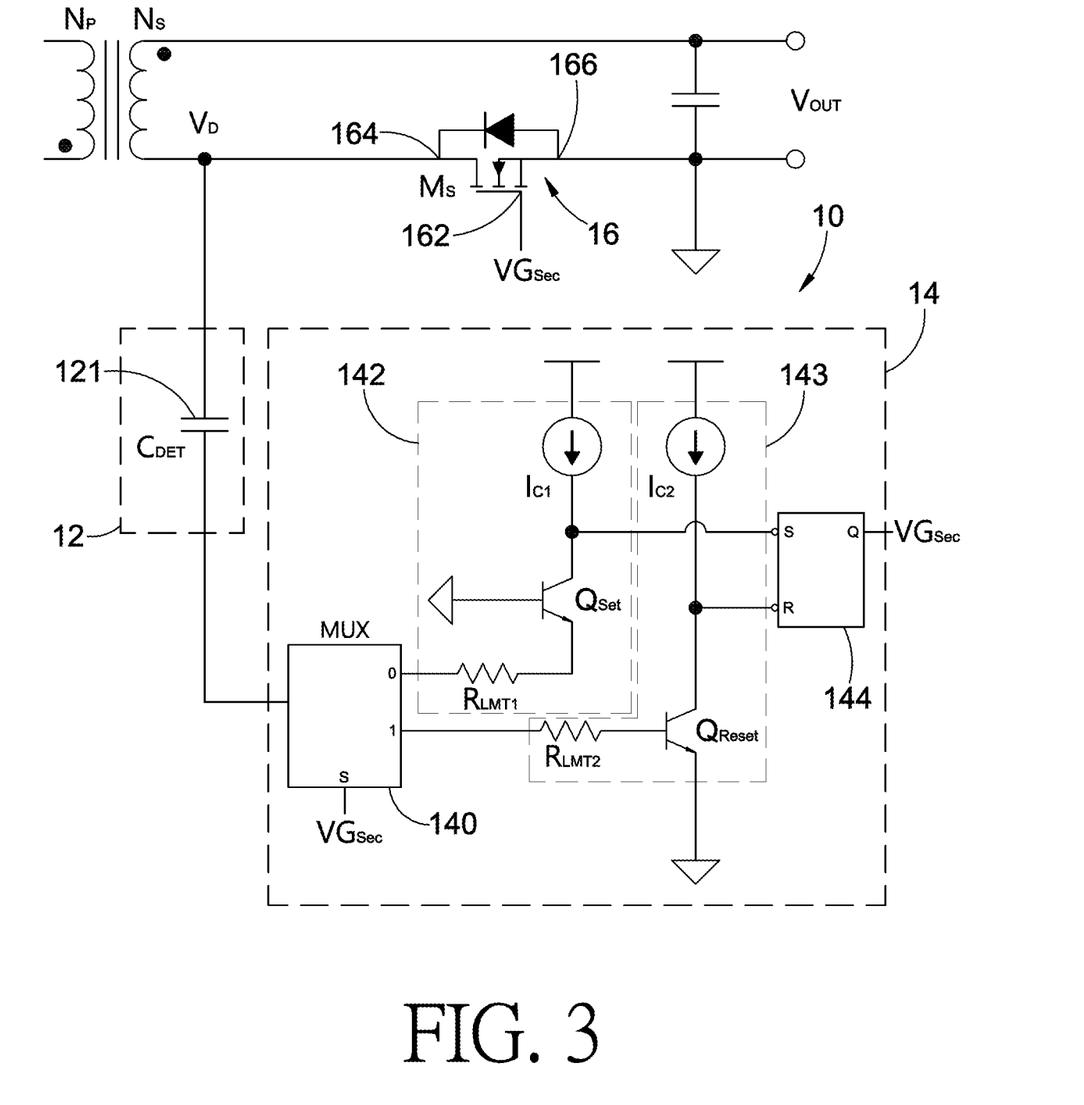
FIG. 3 shows a schematic diagram of a circuit example according to an embodiment of the present application.

To better comprehend the operations of the above embodiment according to the present application, please refer to FIG. 3, which shows a simple circuit example. The state transition detector 12 can include a detection capacitor $C_{DET}$ with both terminals coupled to the secondary winding Ns and the input terminal of the state transition controller 14, respectively. The input terminal of the state transition controller 14 is coupled to a multiplexer 140. The multiplexer 140 is coupled to a first current detection circuit 142 and a second current detection circuit 143, respectively. The first current detection circuit 142 is coupled to a set terminal S of a flip-flop circuit 144. The second current detection circuit 143 is coupled to a reset terminal R of the flip-flop circuit 144. An output terminal Q of the flip-flop circuit 144 is used as the output terminal of the state transition controller 14 for outputting the control signal $VG_{Sec}$ to the switch 16.

Figure 4:
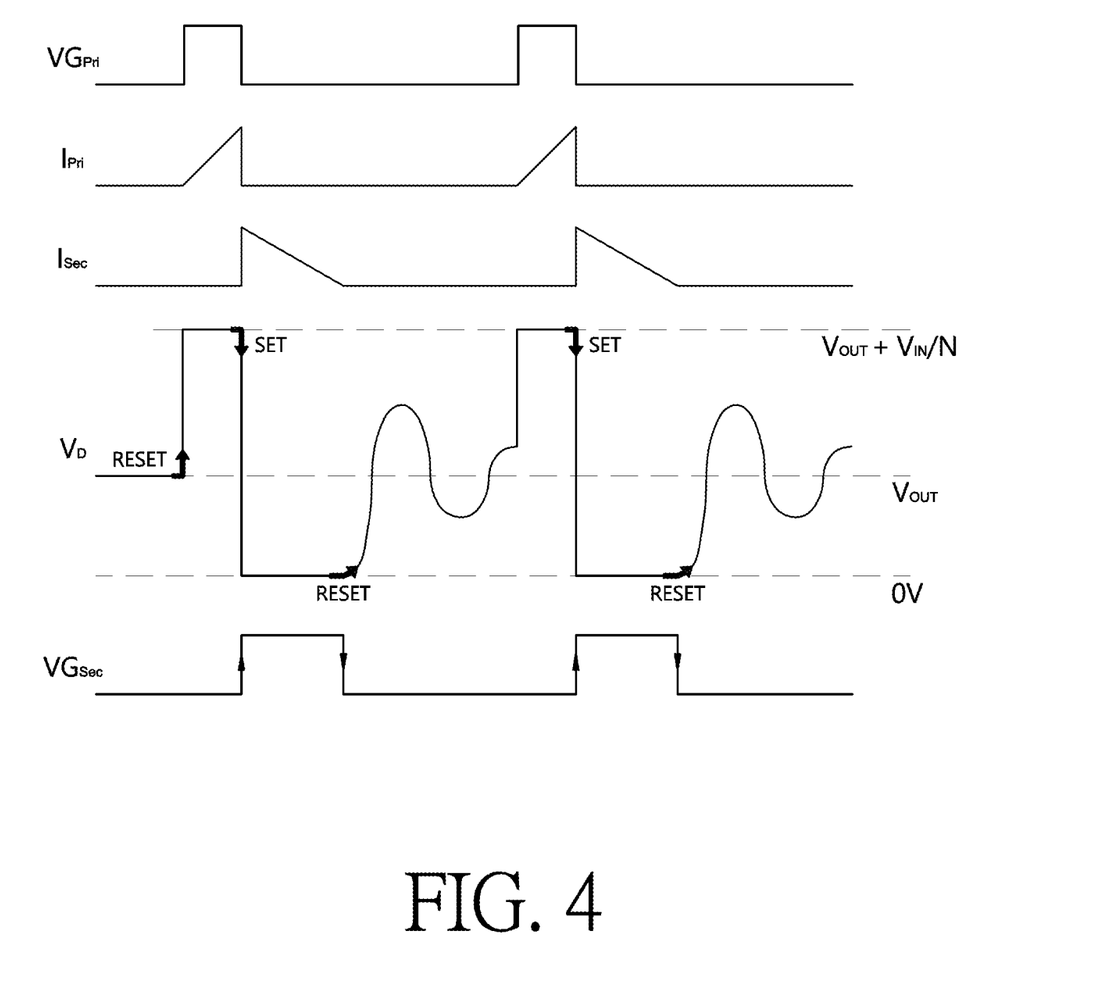
FIG. 4 shows a schematic diagram of signal comparison in the discontinuous conduction mode according to an embodiment of the present application.

Please refer to FIG. 4, which shows a schematic diagram of signal comparison in the discontinuous conduction mode (DCM) according to an embodiment of the present application, where $I_{Pri}$ represents the current flowing in the primary winding Np; $I_{Sec}$ represents the current flowing in the secondary winding Ns. Assume the switch 16 is turned on initially. At this moment, the control signal $VG_{Sec}$ is at a high voltage level 1. Thereby, the multiplexer 140 selects the second current detection circuit 143. In the process when the switch signal $VG_{Pri}$ of the primary winding Np is rising, the induction voltage $V_D$ induced in the second winding Ns will experience a voltage-slope transition. This transient variation is just the positive state transition and will be coupled to the second current detection circuit 143 via the detection capacitor $C_{DET}$. As the induction voltage $V_D$ rises, the current flowing through the second detection circuit 143 will be higher. Once the current reaches a predetermined second reference current $I_{C2}$ of the second current detection circuit 143, the voltage of the reset terminal R of the flip-flop circuit 144 will be pulled to the zero voltage level and enabling the flip-flop circuit 144 to output the control signal $VG_{Sec}$ with a low voltage level 0 and further turning off the switch 16. Thereby, the purpose of controlling the switch 16 to turn off when the positive state transition is detected can be achieved. After the primary-winding switch Mp is turned on, the input voltage VIN will store energy to the second winding Ns via the primary winding Np. Thereby, there will be a current flowing in the primary winding Np. Besides, N is the turns ratio between the primary winding Np and the second winding Ns.

Then, at this time, the control signal $VG_{Sec}$ is at the low voltage level 0. Thereby, the multiplexer 140 selects the first current detection circuit 142. In the process when the switch signal $VG_{Pri}$ of the primary winding Np is falling, the induction voltage $V_D$ induced in the second winding Ns will experience another voltage-slope transition. This transient variation is just the negative state transition and will be coupled to the first current detection circuit 142 via the detection capacitor $C_{DET}$. As the induction voltage $V_D$ falls, the current flowing through the first detection circuit 142 will be higher. Once the current reaches a predetermined first reference current $I_{C1}$ of the first current detection circuit 142, the voltage of the set terminal S of the flip-flop circuit 144 will be pulled to the zero voltage level and enabling the flip-flop circuit 144 to output the control signal $VG_{Sec}$ with the high voltage level 1 and further turning on the switch 16. Thereby, the purpose of controlling the switch 16 to turn on when the negative state transition is detected can be achieved. After the switch 16 is turned on, the second winding Ns will start to release the stored energy. Thereby, there will be a current flowing in the second winding Ns.

In the DCM, before the next turning-on of the primary-winding switch Mp, the secondary winding Ns will be discharged completely. When the secondary winding Ns completes discharging, the induction voltage $V_D$ of the secondary winding Ns will also have a voltage-slope transition. This transient change is also a positive state transition. Thereby, as described above, this transient change will be coupled to the second current detection circuit 143 via the detection capacitor $C_{DET}$ and enabling the flip-flop circuit 144 to output the control signal $VG_{Sec}$ with the low voltage level 0 and further turning off the switch 16. Hence, before the next turning-on of the primary-winding switch Mp, the switch 16 has been controlled to be turned off.

Figure 5:
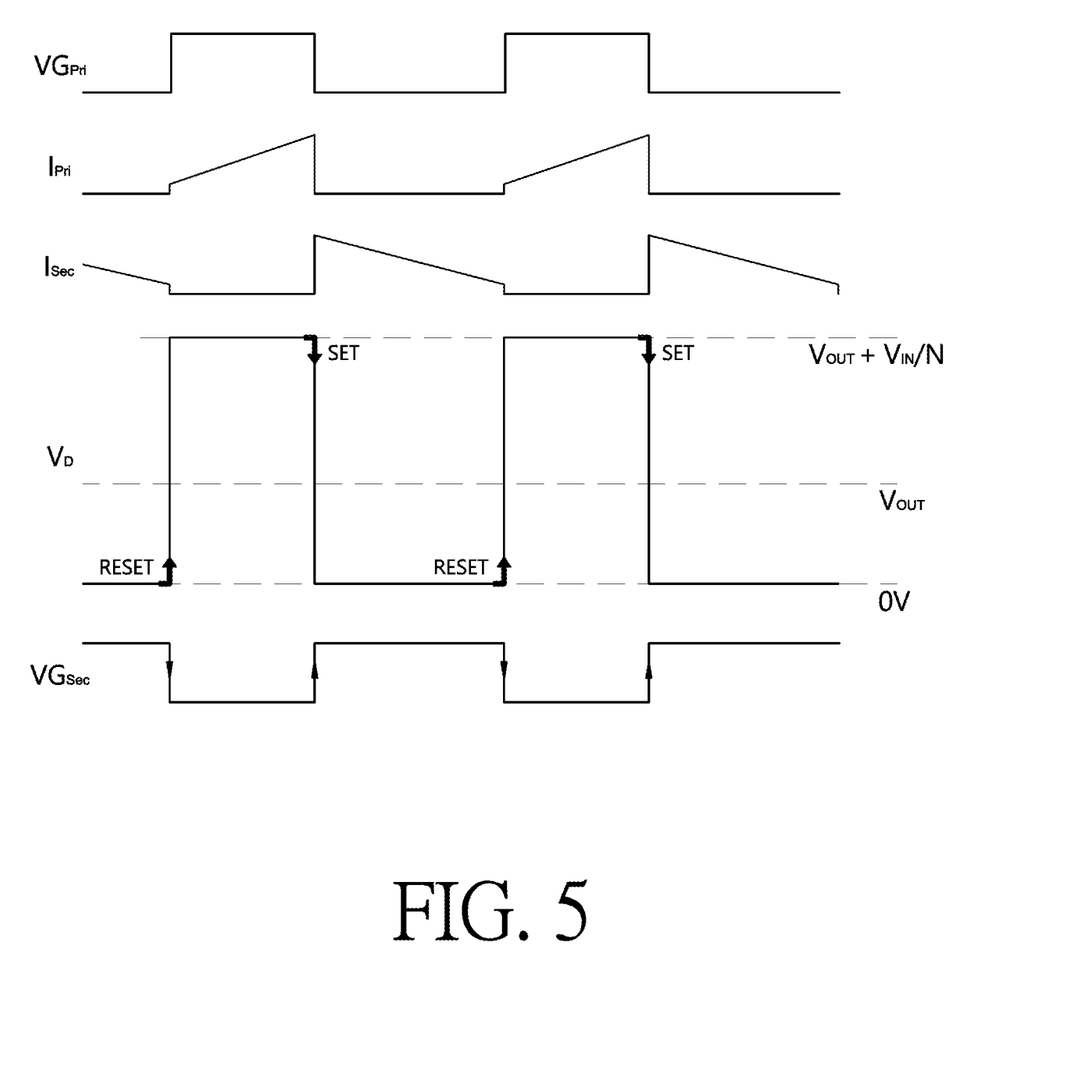
FIG. 5 shows a schematic diagram of signal comparison in the continuous conduction mode according to an embodiment of the present application.

Please refer to FIG. 5, which shows a schematic diagram of signal comparison in the continuous conduction mode (CCM) according to an embodiment of the present application. The difference between the CCM and the DCM shown in FIG. 4 is that, in the CCM, before the secondary winding Ns completes discharging, the primary-winding switch Mp will start the next conduction. Nonetheless, as described above, the positive state transition occurred in the process when the switch signal $VG_{Pri}$ of the primary winding Np is rising will be coupled to the second current detection circuit 143 via the detection capacitor $C_{DET}$ and enabling the flip-flop circuit 144 to output the control signal $VG_{Sec}$ with the low voltage level 0 and further turning off the switch 16. Hence, before the next turning-on of the primary-winding switch Mp, the switch 16 has been controlled to be turned off. Likewise, the synchronous rectification circuit 10 according to the embodiment of the present application can be applied not only to the DCM and the CCM but also to the boundary current mode (BCM), the critical conduction mode (CrM), or the transition mode (TM).

It is noteworthy that the correspondence among the signals of the detection capacitor $C_{DET}$, the first current detection circuit 142, and the second current detection circuit 143 can be expressed as the following equations:

$$i_{c_{QSet}} \approx i_{e_{QSet}} = \frac{sC_{Det} \times V_D}{1 + sC_{Det}R_{LMT1}}$$

$$i_{c_{QReset}} \approx i_{b_{QReset}} \times \beta_{QReset} = \frac{sC_{Det} \times V_D}{1 + sC_{Det}R_{LMT2}} \times \beta_{QReset}$$

In the above equations, $Q_{Set}$ is the switching transistor in the first current detection circuit 142; $Q_{Reset}$ is the switching transistor in the second current detection circuit 143; $R_{LMT1}$ is the resistance of the resistor in the first current detection circuit 142; $R_{LMT2}$ is the resistance of the resistor in the second current detection circuit 143; $i_c$, $i_b$, $i_e$ are currents flowing through the collector, base, and emitter of the BJTs; and $\beta$ is the common-mode current gain of the BJTs. The above equations can be used to set the first reference current $I_{C1}$ and the second reference current $I_{C2}$. In addition, they also show that the sensitivity of detecting the positive and negative state transition of the induction voltage $V_D$ can be adjusted by varying the capacitance of the detection capacitor $C_{DET}$ and the resistance of the resistors $R_{LMT1}$, $R_{LMT2}$.

The detection capacitor $C_{DET}$ described above is only the simplest component to form the high-pass filter required for the state transition detector 12. The purpose is to illustrate the operations of the above embodiment according to the present application. The person having ordinary skill in the art can replace it by circuits with corresponding functions. Likewise, the detailed circuit of the above state transition controller 14 is only an embodiment of generating the control signal $VG_{Sec}$ by detecting the positive or negative state transitions as described above. The present application is not limited to the above embodiment.

Figure 6:
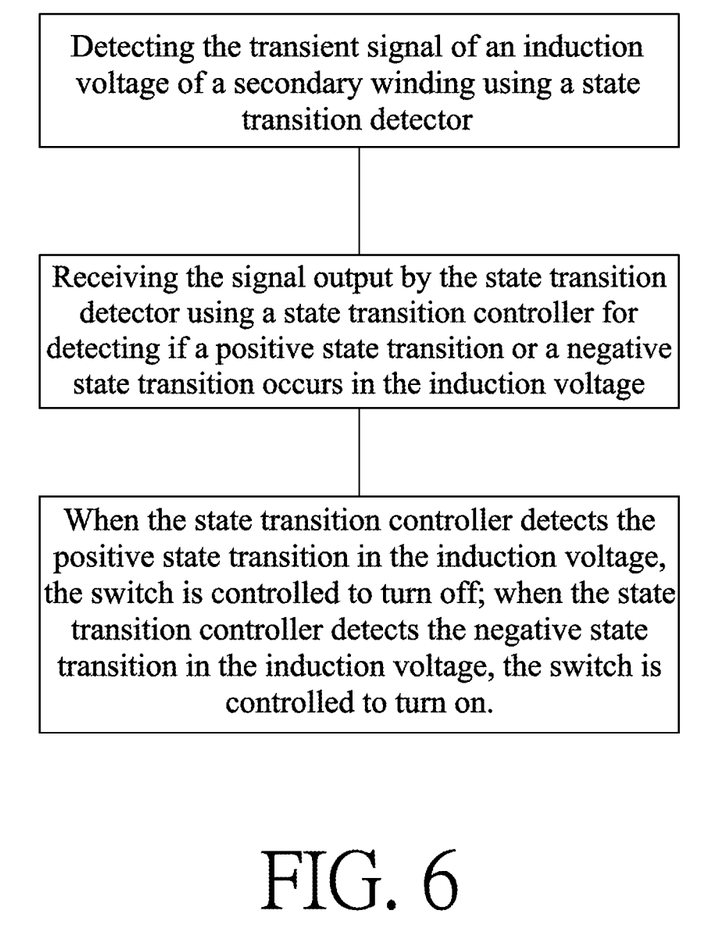
FIG. 6 shows a flowchart of the control method for the synchronous rectification circuit according to an embodiment of the present application.

Please refer to FIG. 6, which shows a flowchart of the control method for synchronous rectification circuit according to an embodiment of the present application. The control method comprises:

measuring the transient variation signal of an induction voltage of a secondary winding using a state transition detector; and receiving the signal output by the state transition detector using a state transition controller for detecting if a positive state transition or a negative state transition occurs in the induction voltage;

where when the state transition controller detects the positive state transition occurring in the induction voltage, the switch is controlled to turn off; when the state transition controller detects the negative state transition occurring in the induction voltage, the switch is controlled to turn on.

To sum up, the present application provides a synchronous rectification circuit and the control method thereof. By detecting positive or negative state transitions occurring in the induction voltage of the secondary winding, the switch of the synchronous rectification circuit can be controlled to turn on or off. Thereby, the simultaneous conduction of the switch of the primary winding and the switch of the synchronous rectification circuit can be avoided. Then the energy conversion efficiency can be improved and the power consumption of a switching power supply can be reduced.

Compared to the prior art that requires a voltage comparator with higher operational speed for lowering the operational delay, the synchronous rectification circuit and the control method thereof according to the embodiment of the present application requires no voltage comparison circuit and hence promises lower costs in circuit design and fabrication. On the other hand, according to the prior art that leading the switch or winding signal of the primary winding to the synchronous rectification circuit of the secondary winding directly for controlling the synchronous rectification circuit using the signal of the primary winding, high-voltage coupling devices or even additional induction coils are required. In contrast, the synchronous rectification circuit and the control method thereof according to the embodiment of the present application does not require the signal of the primary winding of a switching power supply. Thereby, system costs can be saved significantly.

According to the above embodiment, the synchronous rectification circuit according to the present application uses the multiplexer to select the output signal to the comparator. The comparison result signal output by the comparator is used to control the control terminal of the switch for synchronous rectification and thus achieving synchronous rectification with reduced power consumption and circuit area.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. A synchronous rectification circuit, applied for a switching power supply including a primary winding and a secondary winding, said synchronous rectification circuit comprising:

a state transition detector, coupled to said secondary winding;

a state transition controller, coupled to said state transition detector, wherein said transition controller includes a first current detection circuit and a second current detection circuit; and a switch, including a control terminal coupled to said state transition controller;

wherein said state transition detector performs a measurement of the transient variation signal for an induction voltage of said secondary winding; said state transition controller receives the signal output by said state transition detector for detecting if a positive state transition or a negative state transition occurs in said induction voltage by said first current detection circuit or said second current detection circuit; when said state transition controller detects said positive state transition occurring in said induction voltage by said second current detection circuit, said switch is controlled to turn off; and when said state transition controller detects said negative state transition occurring in said induction voltage by said first current detection circuit, said switch is controlled to turn on.

2. The synchronous rectification circuit of claim 1, wherein said negative state transition is a voltage-slope transition occurred in said induction voltage induced in said second winding while a primary switch signal correspondingly coupled to said primary winding is falling.

3. The synchronous rectification circuit of claim 1, wherein said positive state transition is a voltage-slope transition occurred in said induction voltage induced in said second winding in the process while a primary switch signal correspondingly coupled to said primary winding is rising.

4. The synchronous rectification circuit of claim 1, wherein said positive state transition is a voltage-slope transition occurred in said induction voltage when said secondary winding completes discharging.

5. The synchronous rectification circuit of claim 1, wherein said positive state transition occurs before a primary side switch coupled to said primary winding is turned on.

6. The synchronous rectification circuit of claim 1, wherein said state transition detector includes a high-pass filter.

7. The synchronous rectification circuit of claim 6, wherein said high-pass filter includes a detection capacitor.

8. The synchronous rectification circuit of claim 1, wherein an input terminal of said state transition controller is coupled to said state transition detector and a multiplexer, respectively; said multiplexer is coupled to said first current detection circuit and said second current detection circuit, respectively; said first current detection circuit is coupled a set terminal of a flip-flop circuit; said second current detection circuit is coupled to a reset terminal of said flip-flop circuit; and an output terminal of said flip-flop circuit is coupled to said switch for outputting a control signal to said switch.

9. A control method for synchronous rectification circuit, applied to control a synchronous rectification circuit for a switching power supply including a primary winding and a secondary winding, and comprising:

detecting a transient variation signal of an induction voltage of the secondary winding using a state transition detector; and receiving the signal output by said state transition detector using a state transition controller for detecting if a positive state transition or a negative state transition occurs in said induction voltage by a first current detection circuit or a second current detection circuit;

wherein when said state transition controller detects said positive state transition occurred in said induction voltage by said second current detection circuit, a switch is controlled to turn off; when said state transition controller detects said negative state transition occurred in said induction voltage by said first current detection circuit, said switch is controlled to turn on.

10. The control method for synchronous rectification circuit of claim 9, wherein said negative state transition is a voltage-slope transition occurred in said induction voltage induced in said second winding while a primary switch signal correspondingly coupled to said primary winding is falling.

11. The control method for synchronous rectification circuit of claim 9, wherein said positive state transition is a voltage-slope transition occurred in said induction voltage induced in said second winding while a primary switch signal correspondingly coupled to said primary winding is rising.

12. The control method for synchronous rectification circuit of claim 9, wherein said positive state transition is a voltage-slope transition occurred in said induction voltage when said secondary winding completes discharging.

13. The control method for synchronous rectification circuit of claim 9, wherein said positive state transition occurs before a switch coupled to said primary winding is turned on.

* * * * *